SPRINKLER HEAD

Filed July 6, 1971 7 Sheets-Sheet 1

Feb. 13, 1973 JUN TANAKA ET AL 3,716,103

SPRINKLER HEAD

Filed July 6, 1971 7 Sheets-Sheet 4

United States Patent Office 3,716,103
Patented Feb. 13, 1973

3,716,103
SPRINKLER HEAD

Jun Tanaka and Hiroshi Onuki, Tokyo, Japan, assignors to Senju Metal Industry Co., Ltd., Tokyo, Japan Filed July 6, 1971, Ser. No. 159,691
Claims priority, application Japan, July 10, 1970, 45/68,332; Aug. 17, 1970, 45/81,230; Apr. 2, 1971, 46/23,635; June 28, 1971, 46/55,098
Int. Cl. A62c 37/30
U.S. Cl. 169—42 3 Claims

ABSTRACT OF THE DISCLOSURE

The present invention is directed to a sprinkler head for automatically discharging fire extinguishing fluid immediately in response to heat generated by a fire or the like. The sprinkler head includes a collapsible heat sensitive assembly in which a pair of levers are provided to carry a packing support and a cylinder filled with a low melting point metal, with the packing support being held in contact with the cylinder, and wherein a support plate for supporting the levers is outwardly displaced to allow the packing support to fall down on the opening of a deflector used as cover when the metal is melted and flows.

BACKGROUND OF THE INVENTION

This invention relates to a sprinkler head of a sprinkler device for automatic fire extinguishing system, and more specifically to a sprinkler head of the class which, in combination with a collapsible heat sensitive assembly and a deflector used as cover, is capable of uniformly spraying water in a non-directional manner thereby improving fire extinguishing effect.

Most prior art sprinkler heads comprise a threaded body or mounting member, two frames or arms generally downwardly extending from the body member, a deflector or spreader secured above the downward end of each of the arms, and a collapsible assembly mounted between the arms and body member. The disadvantage of these prior art sprinkler heads is that the two arms direct the water spray to only limited directions. Other prior art sprinkler heads have not been suitable for use in a building with low ceilings since they have been constructed with the collapsible assembly mounted between a pair of longitudinally extending arms. The arms projecting from the ceiling not only spoil and the interior design, but also are easily triggered to scatter a stream of water by impact with goods stacked on a fork lift truck or other conveyance.

SUMMARY OF THE INVENTION

It is, therefore, a primary object of the present invention to provide a novel, useful sprinkler head without the above-mentioned defects of the prior art and which is capable of spraying water uniformly in a non-directional manner without arms which might lessen the uniform spray effect.

Another object of the invention is to provide a more compact sprinkler head so as to leave more space, between the ceiling and floor.

A further object of the invention is to provide a sprinkler head which has high heat sensitivity and which is reliable in operation responding only to high temperature generation when fire occurs.

A still further object of the invention is to provide a sprinkler head which is simple and economical to manufacture.

The foregoing object and other objects as well as the characteristic features of the present invention will become more apparent and more readily understandable from the following description and the claim when read in conjunction with the accompanying drawings, in which:

PREFERRED EMBODIMENTS OF THE INVENTION

Figure 1:
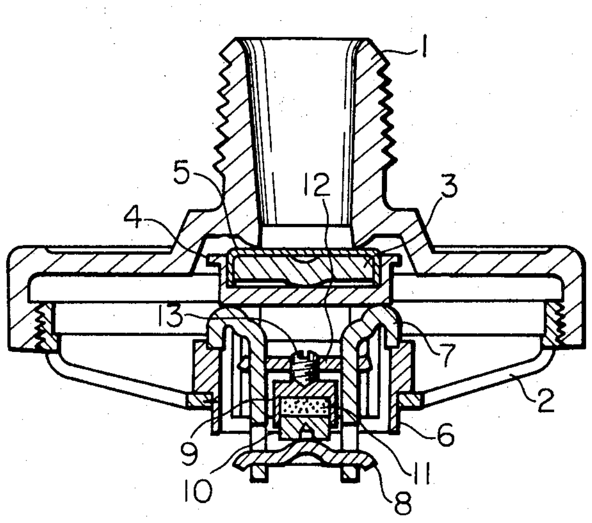
FIG. 1 is a vertical cross section of a sprinkler head according to the present invention.
Figure 2:
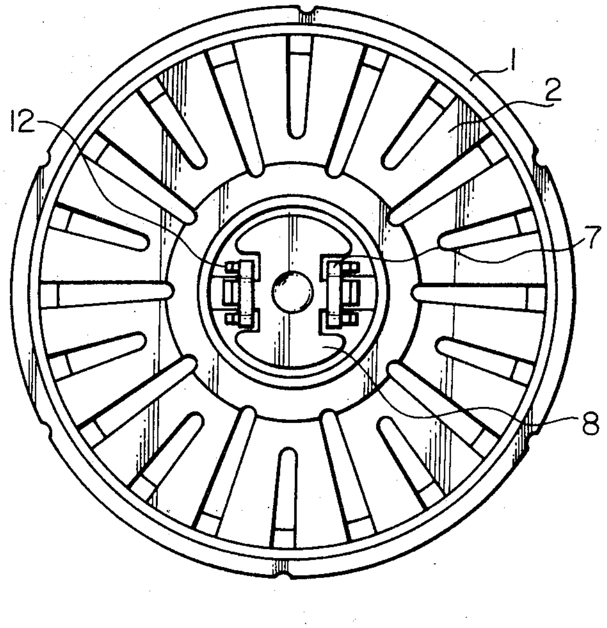
FIG. 2 is a plan view of a deflector which serves as cover for the sprinkler head.

A typical structure of a novel sprinkler head is shown in FIGS. 1 and 2 as being composed of a body 1, a deflector used as cover 2, a valve 3, a split skirt cylinder 4, packing 5, a ring 6, and a collapsible assembly 9, 10, 11.

Figure 3:
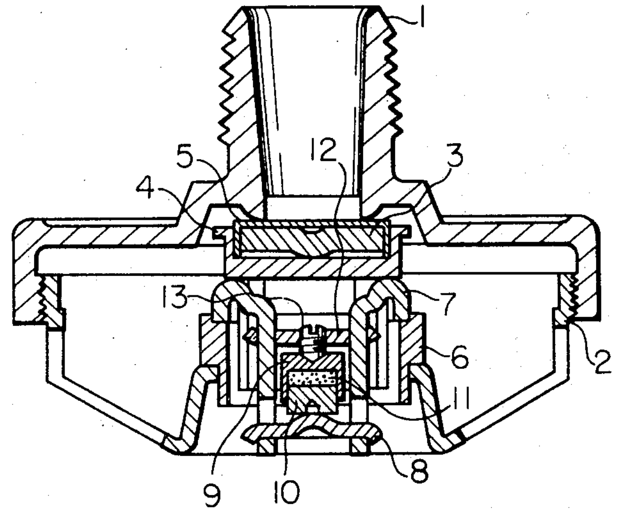
FIG. 3 is a sectional view showing a modification of the construction in accordance with the invention, in which a collapsible heat sensitive assembly is embedded deeply in the head.
Figure 4A:
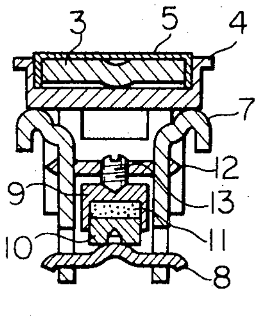
FIG. 4*a* is a sectional view showing part of the collapsible heat sensitive assembly.
Figure 4B:
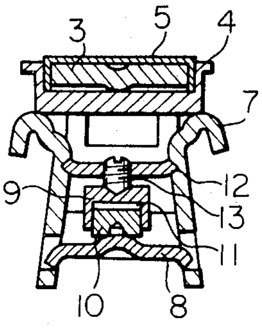
FIG. 4*b* is a sectional view of the collapsible heat sensitive assembly of FIG. 4*a* in an operative position.

As best shown in FIGS. 1, 2, and 3, the exterior of the body member 1 threaded at one end in order that the sprinkler head may be secured to a piping system of a water line or source (not shown).

The other end of the body member 1 is formed into a barrel shape and is internally threaded to screw on a threaded deflector or cover 2.

The deflector 2 in the form of a cup or the like is provided with an opening in its center and a plurality of perforations in a desired pattern through which water passes.

In the embodiment shown in FIG. 3 a somewhat modified construction is used in which like numerals are used to illustrate like parts. The sprinkler head is inwardly recessed to receive the collapsible assembly through the central opening deeper into the head so as to prevent the assembly from being exposed. The sprinkler head, as shown in FIG. 3, includes the round central opening and more perforations than in the embodiment in FIGS. 1 and 2. Referring back to FIG. 1, a cap shaped packing 5 in which a valve member 3 is received, is held on a valve sheet of the body member 1 to prevent leakage of fire extinguishing water or fluid. The packing 5 is designed to include a boss at the center thereof thereby engaging the split skirt cylinder 4. The split skirt is slidably received in the ring 6 which is also received in the central opening of the deflector 2. A pair of slots are formed in opposite sides of the skirt. The cylinder 4 carries the packing 5 with the valve 3 in a cap shaped member provided at its one end. The boss formed in the valve engages the cap shaped base member at the center thereof. The ring 6 comprises an enlarged portion and a reduced portion, with the enlarged portion being stepped to allow a pair of levers 7 of the collapsible assembly to be engaged therewith, the reduced portion being in turn engaged by the deflector 2 at the central opening. If desired, the ring 6 may be integrally formed with the deflector 2 at the central opening.

The collapsible member the details of which are shown in FIGS. 4*a*, 4*b*, 5*a*, 5*b*, 6*a*, 6*b*, 7*a*, 7*b*, 8*a*, and 8*b* comprises a heat sensitive element holder 12, a heat sensitive element, a pair of levers 7, and a key plate 8. Each lever 7 is bent at its one end to keep in contact with the cylinder 4 thereunder and includes a slot at the other end thereof on which the key plate 8 engages. The lever 7 is also provided at its opposite sides with a pair of projections to engage a pair of hook portions of the key plate 8 having, for example, an upwardly projected portion. The holder 12 includes a threaded aperture to allow a set screw 13 to be threaded thereinto. A ball or a projection formed in the heat sensitive element may be substituted for the projected portion of the key plate. This is also the case with the set screw 13.

The heat sensitive element shown in detail in the drawing includes a cup member 9, the upper end of which is held or urged by the set screw 13 through the key plate 8, a fusible material made of, for instance, metal or metal alloy having low melting point and confined in the cavity of the cup member, and a base member 10 for providing a hermetically sealed construction. The base member 10 is provided with a conical-shaped depression to receive the projection of the key plate 8.

In assembling the sprinkler head, the parts are arranged as illustrated in FIGS. 1 and 2 and the deflector 2 is turned to allow it to be screwed in the body member 1 to provide downward pressure acting through the packing 5, the valve 3, the cylinder 4 on the pair of levers 7 which is engaged on the stepped portion of the ring 6. At the same time, as shown, a contact between each lever 7 and the skirt of the cylinder 4 is positioned inwardly of a contact between the bent portion of each lever and the stepped portion of the ring 6 so that the downward directional pressure intends to urge the levers 7 to space them away from each other at the lower end thereof. The levers 7 are, however, held securely in the position by engagement with the holder 12 and the key plate 8. On the other hand, an abutment force is applied to the heat sensitive element since the key plate 8 is maintained against the bias of the levers 7 by their hook portions with the slots of the lever, and the holder 12 is in turn held against the abutment force by engagement with the projections of the levers 7 and the threaded engagement with the set scraw 13. In this manner, the packing 5 and the valve 3 received in the recessed portion of the cylinder 4 is tightly held on the seat of the body member 1 to prevent a discharge or leakage of water.

In operation, the sprinkler head is subjected to a high enough temperature due to a fire to cause the fusible material 11 to melt down and practically flow out from the cup member 9. In other words, the liquefied material 11 is caused to flow out through the clearance between the cup member 9 and the base member 10. This will allow the base member 10 to move against the cup member 9 and shift into the interior portion thereof thereby affecting the power balance between the downward pressure through the base member 10 and the reaction thereto. At this moment, the key plate 8 is disengaged from the levers 7 to swing them thus allowing the lower end of each lever to move out of position so that the holder 12 is also disengaged from the levers to collapse all the collapsible assembly and thereby allowing the same to drop out of the deflector through the ring 6 on the central opening thereof whereupon the split skirt cylinder slides down the wall of the ring 6 until the cap shaped member of the cylinder engages with the central opening of the deflector. The fire extinguishing fluid then flows out from the water line and impinges against the deflector.

It will be readily understood from the foregoing that by provision of the sprinkler head according to the invention, the lengthy arm or frame which is required by the prior art sprinkler head can be eliminated to establish a non-directional water spray in uniform fashion resulting in improved and effective fire extinguishing.

Figure 5A:
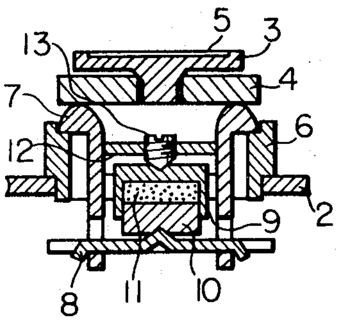
FIG. 5*a* is a sectional view showing a modified form of the collapsible heat sensitive assembly.
Figure 5B:
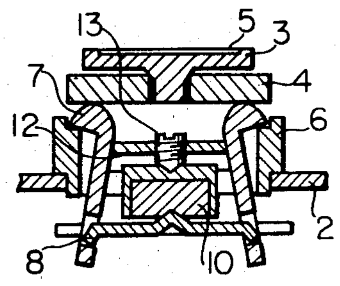
FIG. 5*b* is a cross-sectioned side elevation of the collapsible heat sensitive assembly of FIG. 5*a* in an operative position.

In consideration of efficiency of manufacture and reliability of operation, there is also shown a modified heat sensitive collapsible assembly in FIGS. 5*a*, 5*b* wherein the operation and construction are substantially identical to the previous embodiment, except that the pair of levers 7 are each provided with a bulge formed portion at one end thereof.

Figure 6A:
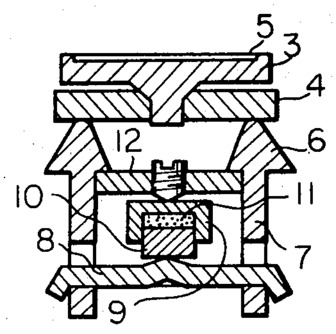
FIG. 6*a* is a sectional elevation of another modified form of the collapsible heat sensitive assembly.
Figure 6B:
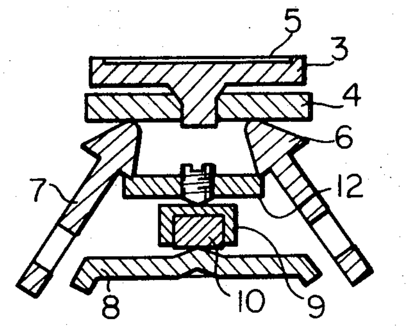
FIG. 6*b* is a sectional view showing the collapsible heat sensitive assembly of FIG. 6*a* when in a collapsed condition.

In FIGS. 6*a*, 6*b* there is shown a further modified collapsible heat sensitive assembly in which the pair of levers 7 are each provided with a triangularly formed portion at one end thereof.

Figure 7A:
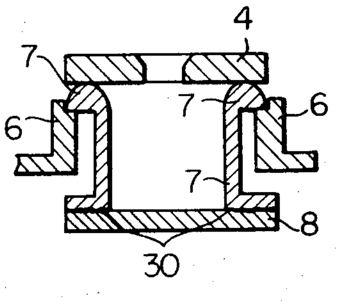
FIG. 7*a* is a cross section of still another modified form of the collapsible heat sensitive assembly.
Figure 7B:
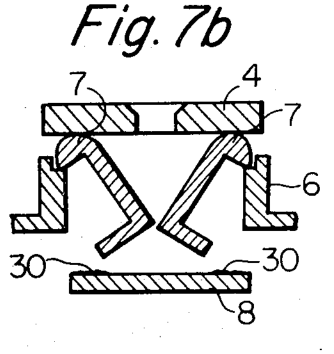
FIG. 7*b* is a sectional view showing the collapsible heat sensitive assembly of FIG. 7*a* when in a collapsed condition.

FIGS. 7*a*, 7*b* illustrate an instance in which a conventional collapsible heat sensitive assembly may be modified to be used in the sprinkler head of this invention. The other end of each lever 7 is bent to form a right angle with the vertical axis thereof and is soldered by a solder 30 to the key plate 8 used as heat collecting plate. When the collapsible assembly is subject to a high enough temperature, the solder 30 is melted to allow the key plate 8 to keep away from the levers 7 thereby displacing the levers and tripping the other parts.

In FIGS. 8*a*, 8*b*, 9*a*, and 9*b*, there are shown still further modified constructions in which the collapsible heat sensitive assembly is provided with a suitable heat collecting element made of excellent heat conductive metallic material incorporated thereinto in order to improve heat sensitivity thereof.

Figure 8A:
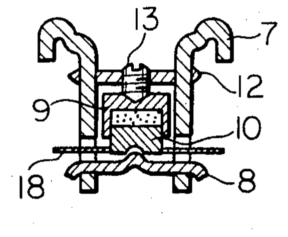
FIG. 8*a* is a sectional view showing another modification of the construtcion in accordance with the invention, in which a heat collecting plate is mounted on the base member of the collapsible heat sensitive assembly so as to increase the heat sensitivity thereof.
Figure 8B:
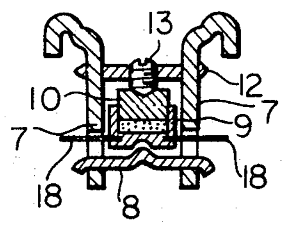
FIG. 8*b* is a vertical section similar to FIG. 8*a* but showing the heat collecting plate mounted on a cylinder of the collapsible heat sensitive assembly.

For example, as shown in FIGS. 8*a*, 8*b*, a heat collector 18 made of metallic material as mentioned is mounted to the cup member 9 or the base member 10 not only to avoid a lack of sensitivity incidental to the previous embodiments but also rather to positively improve heat sensitive or heat collective effect. Although the heat collecting element is formed in a plate like material in this embodiment, it may be made of wire or the like and be pendent from the assembly. Preferably, the heat collecting element is welded to and screwed in or caulked to the collapsible heat sensitive assembly.

Figure 9A:
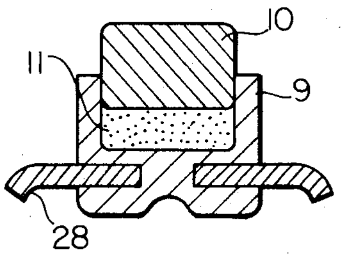
FIG. 9*a* is a fragmentary sectional view of another modified form of the collapsible heat sensitive assembly, a cylinder portion of which carries a heat collecting plate used as lever support plate.
Figure 9B:
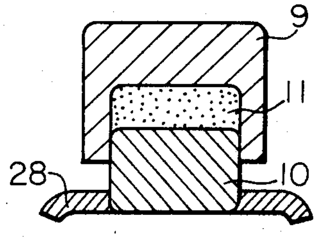
FIG. 9*b* is a view in section similar to FIG. 9*a* but showing the heat collecting plate as lever supporting plate mounted on the base member of the assembly.

FIGS. 9*a*, 9*b* show a still further embodiment in which a heat collecting element is adapted to serve as key plate and by which the structure of the collapsible assembly is simplified and the manufacturing cost is reduced.

Figure 10:
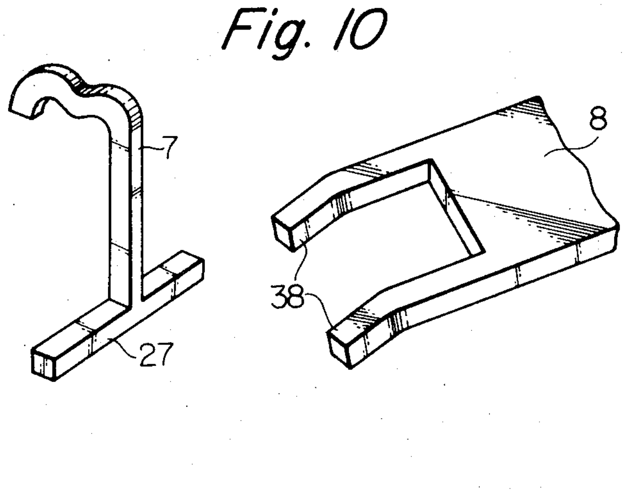
FIG. 10 is a perspective view of a modified form of a lever used for collapse in response to heat.
Figure 11A:
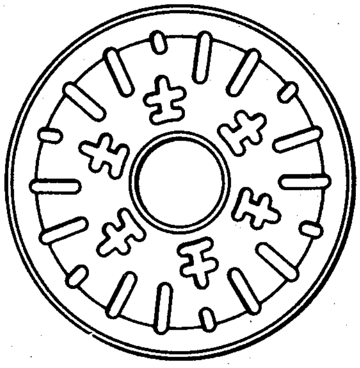
FIGS. 11*a*–11*j* are plan views showing various types of deflector usable as a cover in the sprinkler head of the present invention.
Figure 11B:
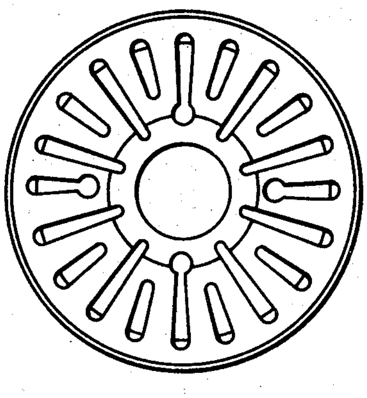
Figure 11C:
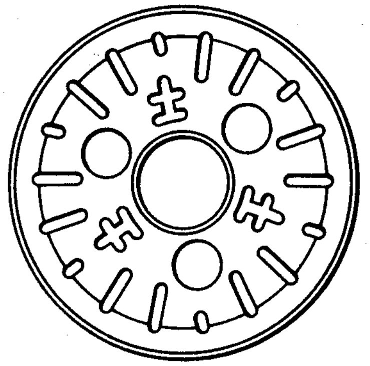
Figure 11D:
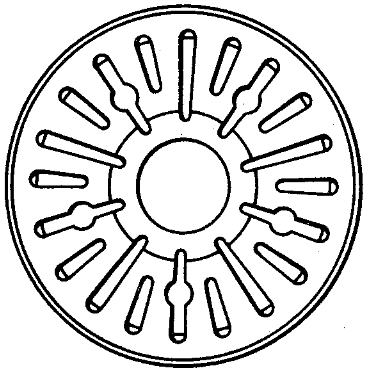
Figure 11E:
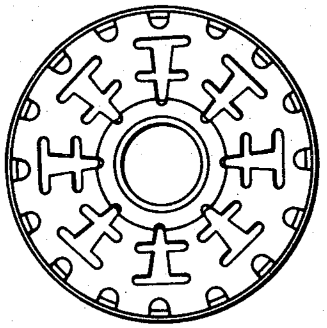
Figure 11F:
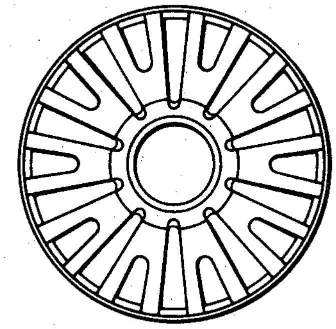
Figure 11G:
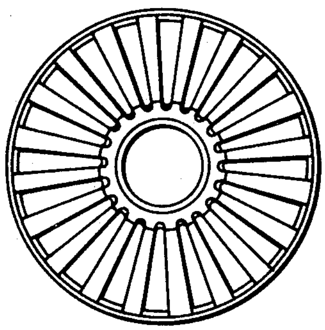
Figure 11H:
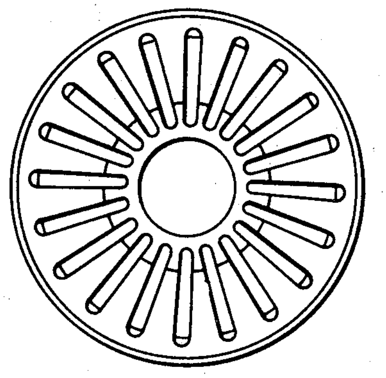
Figure 11I:
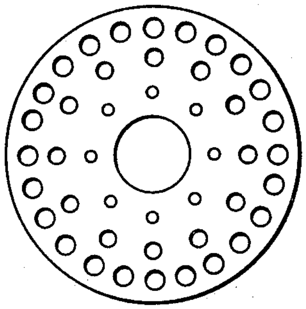
Figure 11J:
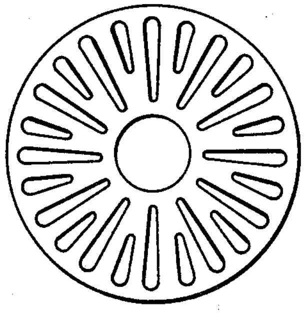

FIG. 10 shows a somewhat modified construction in which each lever 7 is formed into a T-shaped configuration having a lateral member 27 instead of slot whereas the key plate 8 includes a pair of legs 38 at one end thereof to receive and engage the lever 7.

Figure 12A:
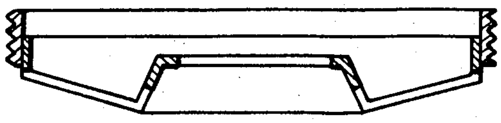
FIGS. 12*a*–12*e* are sectional side elevations of various configurations of the deflector.
Figure 12B:
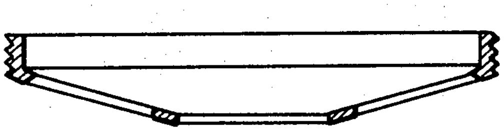
Figure 12C:
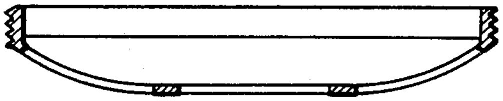
Figure 12D:
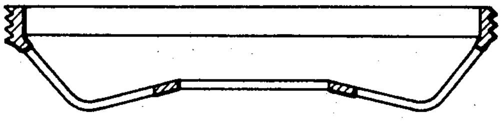
Figure 12E:
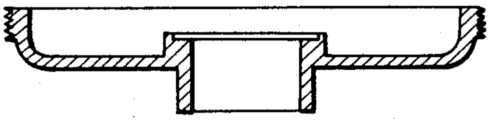

Additionally, various patterns of the perforations as shown in FIGS. 11*a* to 11*j* are advantageous in that the sprinkler head has been tested while installed to ascertain creation of a good spray to extinguish any fire. On the other hand, the deflectors in various cross sections, as shown in FIGS. 12*a* to 12*e* were tested and showed an excellent result in water spray effect and external appearance. For instance, the deflectors shown in FIGS. 12*a* and 12*e* are adapted to conceal the major portion of the collapsible heat sensitive assembly so as to avoid abrupt discharge of water by preventing them from colliding with articles or goods during conveyance.

From the preceding description it will be seen that one feature of the present invention is to provide a sprinkler head by which provision of arms or frames which decrease water spraying efficiency can be eliminated so as to obtain a uniform and non-directional water spraying effect resulting in improved fire extinguishing.

Another feature of the invention is to provide a sprinkler head in which a portion projecting from the ceiling is shorter than that of the prior art not only to make effective use of space indoors but also to allow the building to be low ceiling in comparison with the prior sprinkler head.

A further feature of the invention is to provide a sprinkler head which is capable of embedding and covering the collapsible assembly therewithin to improve its external appearance.

A still further feature of the invention is to provide a sprinkler head structure which provides a compression force to a fusible metal so as to increase creep strength of the heat sensitive element and at the same time to minimize the occurrence of the abrupt discharge of water spray as opposed to the prior structure which applies tension or shearing force to the fusible metal.

Yet another feature of the invention is to provide a sprinkler head in which the collapsible assembly subject to impact, is covered by the deflector used as cover to withstand any kinds of external impacts.

Other advantages of the invention will be enumerated as follows:

(1) Generally, if the sprinkler head is arranged to cover the heat sensitive element, there may be a possibility of lessening heat sensitivity, however, the sprinkler head according to the present invention provides the split skirt cylinder having a pair of slots to allow a hot air to flow into the inside of the head without any resistance to improve heat sensitivity.

(2) Since the sprinkler head according to the present invention is adapted to include the valve 3 having the boss thereon which engages the surface of the cup shaped portion oft he cylinder, a force from the cylinder is imported through such boss to the valve 3, and the packing 5, so that the valve with the packing is flatly held against the seat of the body member to provide a uniform force for the seat thereby never failing to prevent leaking.

(3) Since the sprinkler head structure is such that the valve 3 is received in the packing 5 and, the packing with the valve is in turn received in the split skirt cylinder, they can bodily fall within the ring 6 to ensure uniform water distribution.

(4) Generally, if the one end of the lever 7 is sharpened or pointed at a position where the lever engages the split skirt cylinder, the lever would be cut into the cylinder to increase resistance to prevent the collapsible assembly from collapsing even if the fusible material is melted. On the contrary, according to the present invention, the lever 7 is formed of a strip and is bent to form a smooth curve so as to prevent the lever from being cut into the cylinder thereby ensuring a collapse of the assembly.

Various changes in the size and shape of the different parts, as well as modifications and alternations, may be made within the scope of the appended claims.

What we claim is:

1. A sprinkler head comprising:

a body member having at its one end an opening for communication with a water supply and at the other end a valve seat formed centrally of the body member, a valve for closing said valve seat, a deflector with a ring mounted in said body member so as to hold said valve against said valve seat and having a central opening opened concentrically with said valve seat thereby effectively dispersing an extinguishing fluid, and a collapsible assembly disassembled under influence of heat derived from the outbreak of a fire and adapted to urge said valve against said valve seat, characterized in that said collapsible assembly comprises a pair of oppositely and downwardly extending pivotal levers engageable with said ring within said central opening so as to ensure a retention of said valve, a holder supported by said levers and carrying a cup member, a key plate the opposite ends of which are engageable with the respective levers at the lower ends thereof to normally prevent said levers from outwardly moving, and heat sensitive means having a cup member sealedly containing therein a fusible material melted at a predetermined melting point, and a base member adapted to urge said fusible material by said key plate.

2. The sprinkler head of claim 1 wherein said deflector has a plurality of perforations in various patterns formed therearound whereby water may be effectively distributed in every direction.

3. The sprinkler head of claim 1 wherein said central opening of said deflector is formed in a recessed portion at the center thereof.

References Cited

UNITED STATES PATENTS

| | | | |
|---|---|---|---|
| 2,553,726 | 5/1951 | Rowley | 169—42 |
| 2,534,065 | 12/1950 | Rowley | 169—42 |
| 1,919,508 | 7/1933 | Griffith | 169—42 |
| 3,599,723 | 8/1971 | Vorkapich | 169—42 |
| 3,605,902 | 9/1971 | Ault | 169—42 |

LLOYD L. KING, Primary Examiner